United States Patent
Kleinecke et al.

(10) Patent No.: US 7,876,586 B2
(45) Date of Patent: Jan. 25, 2011

(54) MULTI-PULSE RECTIFIER FOR AC DRIVE SYSTEMS HAVING SEPARATE DC BUS PER OUTPUT PHASE AND MULTIPLE ISOLATION TRANSFORMERS

(75) Inventors: John D. Kleinecke, Houston, TX (US); Mike Daskalos, Magnolia, TX (US); Takashi Morishita, Houston, TX (US)

(73) Assignee: Toshiba International Corporation, Houston, TX (US)

( * ) Notice: Subject to any disclaimer, the term of this patent is extended or adjusted under 35 U.S.C. 154(b) by 428 days.

(21) Appl. No.: 12/098,658

(22) Filed: Apr. 7, 2008

(65) Prior Publication Data

US 2009/0251935 A1     Oct. 8, 2009

(51) Int. Cl.
*H02M 7/06* (2006.01)
(52) U.S. Cl. .................................... 363/67; 363/126
(58) Field of Classification Search .................... 363/67, 363/68, 70, 126
See application file for complete search history.

(56) References Cited

U.S. PATENT DOCUMENTS

| | | | | |
|---|---|---|---|---|
| 5,124,904 | A * | 6/1992 | Paice | 363/3 |
| 6,058,031 | A * | 5/2000 | Lyons et al. | 363/67 |
| 6,101,113 | A * | 8/2000 | Paice | 363/126 |
| 6,385,064 | B1 * | 5/2002 | Zhou et al. | 363/44 |
| 6,498,736 | B1 * | 12/2002 | Kamath | 363/44 |
| 6,861,936 | B2 | 3/2005 | Kamath | |
| 6,954,366 | B2 | 10/2005 | Lai | |
| 7,049,921 | B2 * | 5/2006 | Owen | 336/5 |
| 2006/0044857 | A1 | 3/2006 | Lemak | |
| 2008/0165553 | A1 * | 7/2008 | Swamy | 363/67 |
| 2008/0205101 | A1 * | 8/2008 | Kleinecke et al. | 363/70 |
| 2009/0251935 | A1 * | 10/2009 | Kleinecke et al. | 363/125 |

* cited by examiner

*Primary Examiner*—Jeffrey L Sterrett
(74) *Attorney, Agent, or Firm*—Banner & Witcoff, Ltd.

(57) ABSTRACT

An 18n-pulse rectifier for AC drive systems having a separate DC bus for each output phase is provided, where n=any positive integer. The rectifier uses three separate phase rectifiers, one for each output phase of a transformer, each comprised of 2n six-pulse diode bridges connected in series or parallel. Each phase rectifier may be supplied with n unique sets of phase inputs from a transformer secondary winding. In some configurations, the n sets of inputs provided to each rectifier are separated by 60/n degrees of phase (when n is greater than 1), while the corresponding inputs to neighboring rectifiers are separated by 20/n degrees of phase. In a 36-pulse example, the phase offsets for the inputs provided to the rectifiers may be −25° and +5° from the transformer primary winding (for the first rectifier), −15° and +15° from the primary winding (for the second rectifier) and −5° and +25° from the primary winding (for the third rectifier). Each set of inputs may include three lines of in-phase current, and may be coupled to one of the six-pulse diode bridges. In some configurations, two identically-wound transformers may be used to supply output voltages to the rectifiers. The transformers may each supply the same phase offsets to each rectifier, in accordance with the methodology above, which may support higher-capacity applications.

20 Claims, 4 Drawing Sheets

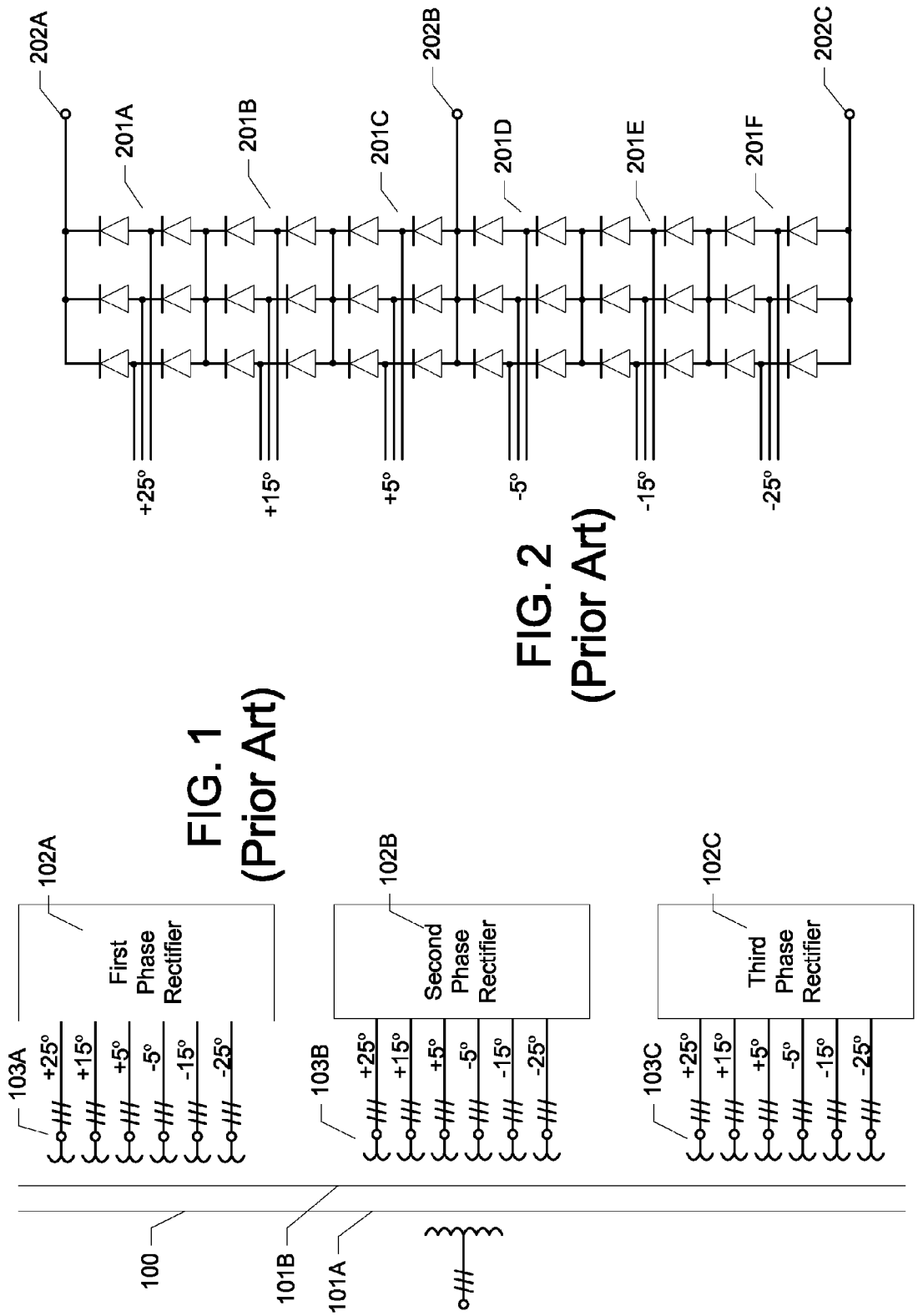

| Harmonic | 6 pulse* | 12 pulse* | System 18 pulse* | 24 pulse* | 36 pulse* | MTX 36 pulse** | IEEE 519 limit |
|---|---|---|---|---|---|---|---|
| 5 | 29.50% | 7.90% | 3.94% | 2.56% | 1.90% | 1.50% | 4.00% |
| 7 | 8.30% | 2.23% | 1.34% | 0.97% | 0.72% | 0.64% | 4.00% |
| 11 | 5.79% | 5.79% | 0.42% | 0.29% | 0.20% | 0.64% | 2.00% |
| 13 | 3.33% | 3.33% | 0.40% | 0.19% | 0.13% | 0.43% | 2.00% |
| 17 | 2.01% | 0.54% | 1.18% | 0.13% | 0.06% | 0.23% | 1.50% |
| 19 | 1.77% | 0.47% | 0.94% | 0.13% | 0.05% | 0.17% | 1.50% |
| 23 | 0.95% | 0.95% | 0.13% | 0.43% | 0.04% | 0.14% | 0.60% |
| 25 | 0.90% | 0.90% | 0.09% | 0.38% | 0.03% | 0.19% | 0.60% |
| 29 | 0.68% | 0.18% | 0.07% | 0.06% | 0.04% | 0.16% | 0.60% |
| 31 | 0.54% | 0.15% | 0.08% | 0.04% | 0.04% | 0.15% | 0.60% |
| 35 | 0.49% | 0.49% | 0.26% | 0.03% | 0.16% | 0.19% | 0.30% |
| 37 | 0.42% | 0.42% | 0.23% | 0.02% | 0.15% | 0.12% | 0.30% |
| 41 | 0.32% | 0.09% | 0.04% | 0.02% | 0.02% | 0.07% | 0.30% |
| 43 | 0.32% | 0.09% | 0.03% | 0.03% | 0.02% | 0.06% | 0.30% |
| 47 | 0.24% | 0.24% | 0.03% | 0.10% | 0.01% | 0.03% | 0.30% |
| 49 | 0.23% | 0.23% | 0.03% | 0.10% | 0.01% | 0.04% | 0.30% |
| THD % | 31.53% | 10.71% | 4.48% | 2.83% | 2.06% | 2.73% | 5.00% |

\* Data Generated by Simulation
\*\* Measured Test Data

FIG. 5

MULTI-PULSE RECTIFIER FOR AC DRIVE SYSTEMS HAVING SEPARATE DC BUS PER OUTPUT PHASE AND MULTIPLE ISOLATION TRANSFORMERS

BACKGROUND

Power plants in the U.S. produce three-phase alternating current (AC) electricity, which is then distributed, stepped down and/or rectified as needed to produce the desired type of electricity for individual customers. For many applications, it is useful to rectify the AC electricity to generate a direct current (DC) (or near-DC) output. Full-wave rectification of a three-phase input can be accomplished using a six-pulse diode bridge for each output phase.

The six-pulse bridge, however, generates unwanted harmonic distortion that is passed back to the power plant. Existing standards, such as IEEE 519 (Institute of Electrical and Electronics Engineers), govern the amount of distortion that a given component is permitted to cause. For example, IEEE 519 generally limits total harmonic distortion (THD) to about 5%, and the typical six-pulse bridge exceeds that distortion level.

One way of reducing this distortion is to use more than one bridge per phase. For example, some systems use 2, 3 or more bridges per phase, where using more bridges helps reduce the amount of distortion. FIG. 1 shows an example of such a known configuration, in which each output phase uses 6 six-pulse diode bridges, resulting in 36-pulses of current per cycle. As illustrated in FIG. 1, transformer 100 includes an input side 101A and an output side 101B. Three 36-pulse rectifiers 102A,B,C are coupled to secondary windings on the output side of the transformer to produce three output phases. As shown in FIG. 1, each 36-pulse rectifier 102A is fed by six sets of secondary windings 103A. The secondary windings are set at ten degrees separation from one another, and are shown as being +25°, +15°, +5°, −5°, −15° and −25° offset from the primary winding of the input side 101A. The rectifiers in the three phases are all identical in configuration, and are each supplied with six inputs having the same respective phase relationships (e.g., rectifiers 102B and 102C are also fed six inputs that share the same phase relationships found in the six inputs supplied to the first phase rectifier 102A). The result is a three-phase 36-pulse rectification configuration that provides a THD at around 2%, which is well below the IEEE 519 maximum.

FIG. 2 shows one of the 36-pulse rectifiers (102A,B,C) from FIG. 1 in greater detail (as noted above, they are all identical and are provided the same inputs). The 6 six-pulse bridges (201A-F) in each rectifier are shown as being supplied with six inputs from the transformer's secondary windings having the phase relationship noted above (e.g., ten degrees separation from one another). Output is available on positive terminal 202A, common terminal 202B and negative terminal 202C.

The 36-pulse rectifiers used in FIGS. 1 and 2 offer significantly reduced distortion as compared to a single six-pulse rectifier, but at a significantly increased cost. The additional diode bridges and their respective inputs from the secondary windings drive up the overall cost of implementing this configuration. Accordingly, there is a constant need for improved systems that can supply comparable results at a lower cost.

SUMMARY

The following summary generally addresses many of the features described herein, but is not intended to limit the scope of this disclosure or identify features of greater importance to the claims herein. Although an improved 36-pulse system is used as an example herein, it should be noted that the techniques described are equally applicable to other multi-pulse systems using various combinations of 6-pulse rectifiers.

The systems and features described herein relate, for example, to providing a 36-pulse rectifier using fewer components than used in traditional 36-pulse rectifiers. The system may include a transformer having an input side and an output side, wherein the output side includes six sets of secondary windings at different phase offsets, and three twelve-pulse rectifiers, each rectifier coupled to a unique two of the six sets of secondary windings. The twelve-pulse rectifiers may be made by connecting two six-pulse diode bridges in series or parallel.

In some aspects, each rectifier is coupled to a unique two of the six sets of secondary windings that are separated in phase by thirty degrees. Corresponding inputs of neighboring rectifiers may be separated in phase by ten degrees, and the six sets of secondary windings may also be spaced apart by ten degrees. In some aspects, a first of the rectifiers is coupled to a first set of secondary windings that is 25 degrees behind a primary winding of the transformer and a second set of secondary windings that is 5 degrees ahead of the primary winding; a second of the rectifiers is coupled to a third set of secondary windings that is 15 degrees behind the primary winding and a fourth set of secondary windings that is 15 degrees ahead of the primary winding; and a third of the rectifiers is coupled to a fifth set of secondary windings that is 5 degrees behind the primary winding and a sixth set of secondary windings that is 25 degrees ahead of the primary winding.

Furthermore, the system may be implemented with two redundant transformers providing input voltages to the rectifiers. The transformers may each provide identical sets of secondary windings and outputs to the rectifiers, although the phases of the sets provided to each rectifier may be different from the phases supplied to the other rectifiers.

Additional features described herein will be addressed in greater detail below.

BRIEF DESCRIPTION OF THE DRAWINGS

FIG. 1 illustrates a three-phase configuration using three 36-pulse rectifiers in which each rectifier is provided with the same input (phase) as is provided to the other rectifiers.

FIG. 2 illustrates in greater detail the configuration of each 36-pulse rectifier used in the FIG. 1 configuration.

FIG. 5 contains a table of data values showing harmonic distortions for a variety of configurations, including the one shown in FIGS. 3 and 4, as compared to requirements of IEEE 519.

DETAILED DESCRIPTION

Figure 3:
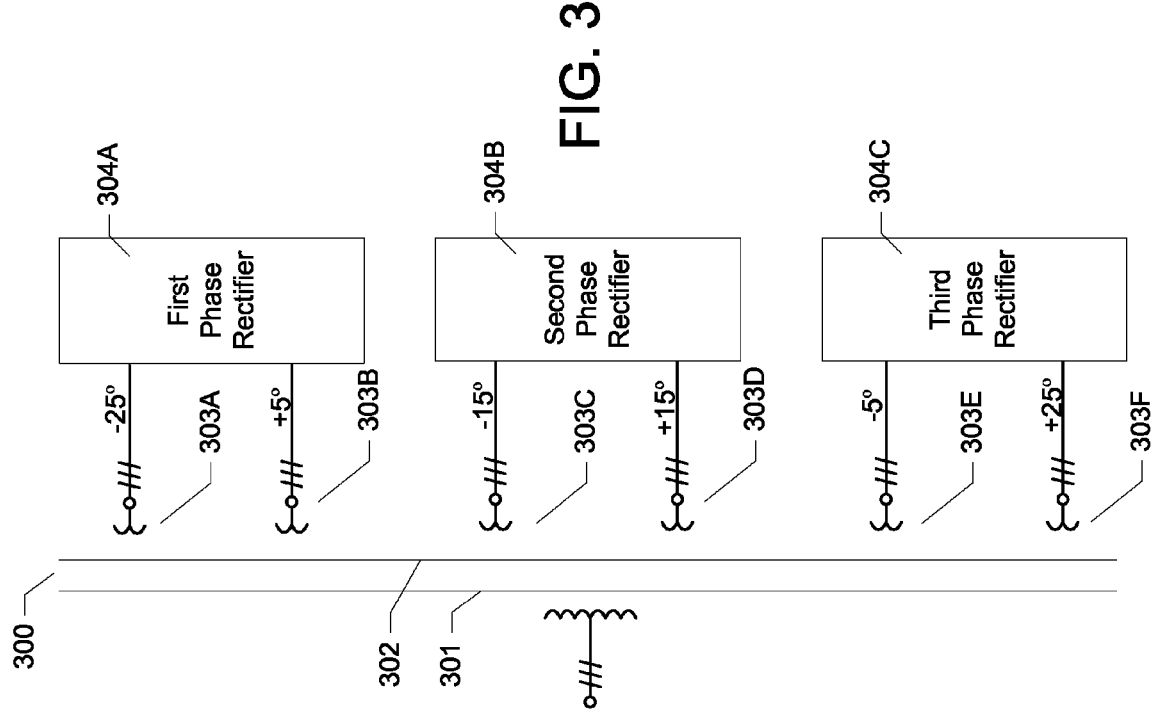
FIG. 3 illustrates a three-phase configuration using three 12-pulse rectifiers in which each rectifier is not provided with the same input (phase) as is provided to the other rectifiers.

FIG. 3 illustrates an example three-phase configuration. As shown, a transformer 300 includes an input (primary) side 301, and an output (secondary) side 302. The output side 302 may include a plurality of secondary windings to produce current outputs having a different level and/or phase from that found in an input side primary winding. In FIG. 3, the transformer 300 offers six sets of secondary windings 303A-F. The six sets are shown as being spaced apart by ten degrees, ranging from being 25 degrees behind the primary winding (minus 25° of set 303A) to being 25 degrees ahead of the primary winding (plus 25° of set 303F).

In FIG. 3, these sets are distributed, in pairs, to three separate phase rectifiers 304A-C. They are distributed such that the two sets received by each rectifier are spaced 30 degrees apart from one another. So, for example, the first rectifier 304A is shown as receiving a set that is at minus 25 degrees from the primary, and a set at positive 5 degrees, totaling 30 degrees of separation. The other two rectifiers are similarly situated, with the second rectifier 304B receiving inputs of minus and positive 15 degrees, and the third rectifier 304C receiving inputs of minus 5 degrees and positive 25 degrees. Aside from the 30 degrees separating the two inputs for each rectifier, each rectifier's inputs are also ten degrees apart from corresponding inputs in its neighboring rectifier. For example, the first input to the first rectifier, input 303A (at minus 25 degrees), is ten degrees apart from the first input to the second rectifier, input 303C (at minus 15 degrees), which in turn is ten degrees apart from the first input to the third rectifier (input 303E, which is at minus 5 degrees). The second inputs to each of the rectifiers are also ten degrees apart from one another (e.g., plus 5 degrees, plus 15 degrees and plus 25 degrees). A separate DC bus is supplied to each output phase to support this distribution.

Figure 4:
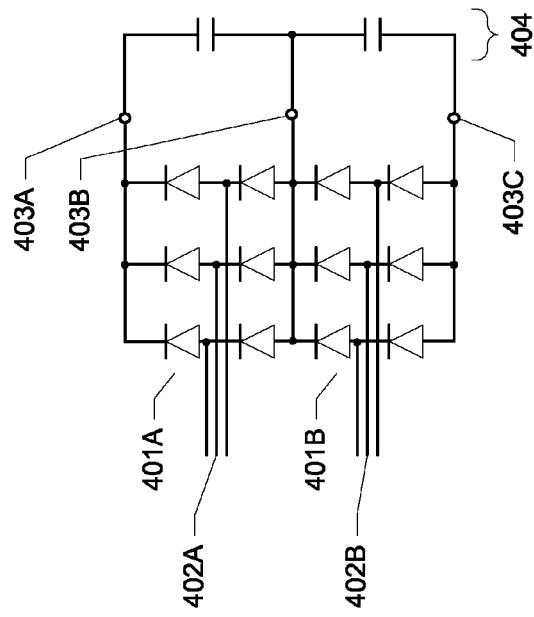
FIG. 4 illustrates in greater detail the configuration of the 12-pulse rectifier used in the FIG. 3 configuration.

FIG. 4 illustrates a rectifier (304A-C) in greater detail. As illustrated, the rectifier 304 may be a twelve-pulse rectifier comprised of two six-pulse diode bridge rectifiers (401A-B) coupled in series. Other configurations, such as a parallel configuration, could alternatively be used. The two inputs supplied to the rectifiers in FIG. 3 are shown as inputs 402A and 402B, and are supplied as three lines sharing the same phase. For example, the secondary winding set 303A is supplied on three lines to the input 402A of rectifier 304A, with the three lines connected between series diodes as shown in FIG. 4. The second input 303B is similarly provided on three lines to input 402B of rectifier 304A. The rectifier may provide its output signals at a positive (403A), common (403B) and negative (403C) terminal. These output signals may be provided to a DC/filtering section, or DC bus 404. Each output phase of this configuration may be provided with its own DC bus, as opposed to having a common DC bus for the three output phases.

Accordingly, the transformer 300 may offer six sets of secondary windings set at different phase relationships, where the secondary windings are distributed in pairs among three twelve-pulse rectifiers. By spacing the phase relationships of the secondary windings so that the six sets are different from one another, the three twelve-pulse rectifiers provide a total of 36 pulses of primary current per cycle, but have the parts count of a twelve-pulse design (using just 2 six-pulse bridges per phase instead of 6).

Testing has shown that the design shown in FIGS. 3 and 4 can offer a THD value of about 2.73%, which is comparable to (although still a bit higher than) that of the conventional 36-pulse design shown in FIG. 1, but which is much better than that of a conventional 12-pulse design (which supplies the same pairs of inputs to all three twelve-pulse rectifiers). The table in FIG. 5 contains data illustrating example odd-order input current harmonics that result from conventional 6-, 12-, 18-, 24- and 36-pulse designs (all of which resemble FIGS. 1 and 2, but with differing numbers of six-pulse bridges per phase—the six-pulse design uses one six-pulse bridge per phase, the twelve-pulse design uses two six-pulse bridges per phase, etc.), as compared to the measured harmonics generated using the FIG. 3/4 design ("MTX 36 pulse") and the IEEE 519 limits.

The designs shown in FIGS. 3 and 4 offer improvements, but modifications to these designs are also possible. For example, the phase offsets between the secondary windings 303A-C and the primary winding 301 are shown in FIG. 3, but other offsets from the primary winding may be used as well, so long as the internal phase relationships between rectifier inputs (e.g., thirty degrees between inputs to a single rectifier, ten degrees between corresponding inputs of neighboring rectifiers) is maintained.

This 10-degree/30-degree relationship described above is shown for the example in which a transformer supplies 6 sets of uniquely-phased secondary windings distributed across the three rectifiers in the three-phase system. Different numbers of secondary windings can be used, and the phase relationships can be adjusted accordingly. In a system having three rectifiers and 3n (with n being an integer of 1 or greater) sets of uniquely-phased secondary windings, each rectifier receives n sets of unique secondary windings. The 3n secondary windings offered by the transformer are spaced apart at intervals of 20/n degrees. In the case where n=2 or more, the n sets of secondary windings that are supplied to a given rectifier are spaced apart at intervals of 60/n degrees. So in the example illustrated in FIG. 3, the transformer supplies 6 sets of secondary windings, making n=2 for that example. The six sets are at 10 degree intervals (20/2), and the n sets provided to each given rectifier are at 30 degree intervals (60/2). As another example, in an 18-pulse system where the transformer provides 3 sets of secondary windings, the secondary windings would be at intervals of 20 degrees (20/1), and each rectifier is comprised of a single six-pulse bridge supplied by a single secondary winding. As yet another example, in a 54-pulse system where the transformer provides 9 sets of secondary windings, the secondary windings would be at intervals of 6.667 degrees (20/3), and each rectifier is provided with three (n=3) unique sets of secondary windings at intervals of 20 (60/3) degrees. The discussion above uses phase intervals, and the actual choice of angles can vary as long as the intervals are preserved. For example, two windings that are to be 10 degrees apart can be 0 and 10 degrees, 5 and 15 degrees, etc.

Further modifications and/or additions may be made as well. For example, control circuitry and smoothing filters may be added to the output terminals (403A-C) of the rectifiers between the rectifiers and their respective loads.

Figure 6:
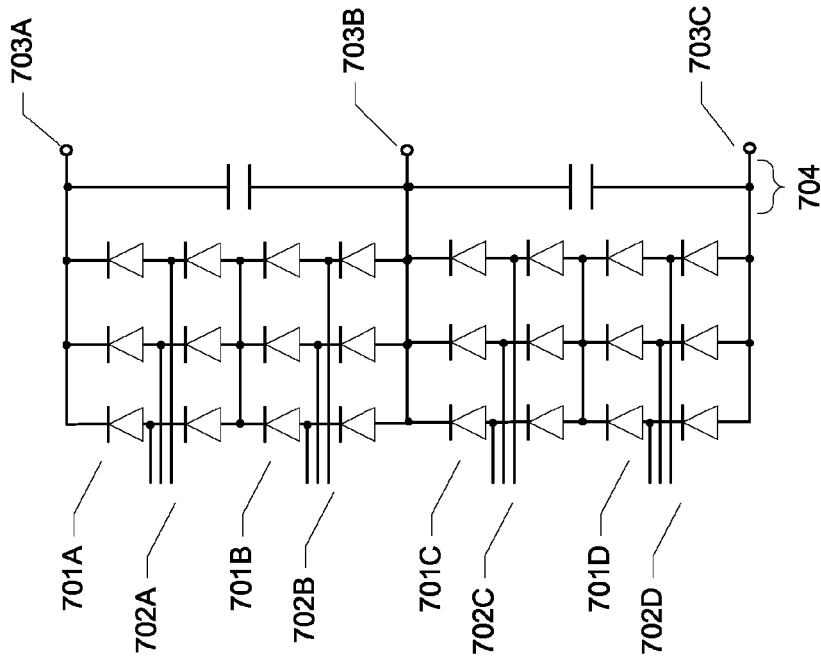
FIG. 6 illustrates an alternative configuration from the one shown in FIG. 3, employing two transformers.

In the FIG. 3 example described above, the system is shown as being supplied with three-phase voltage from a single transformer 300. However, the system need not be limited to just a single transformer, and in some implementations, multiple isolation transformers may be used. FIG. 6 illustrates an example of such a configuration. In the FIG. 6 example, two transformers 600A and 600B are shown. The transformers 600A-B may be provided with identical three-phase input at primary windings 601A-B, and the transformers 600A-B may include a plurality of sets of secondary windings offering stepped versions of the input at different phase offsets from the primary input. In the illustrated example, each transformer is shown as providing secondary windings that output voltages at −25°, +5°, −15°, +15°, −5° and +25°. Other offsets may be used in the manner described above with respect to the FIG. 3 configuration. Each transformer 600A-B may provide two outputs to a given phase rectifier 604A-C, and the outputs that each transformer 600A-B gives to any given rectifier 604A-C may be of identical phase offsets. For example, each transformer 600A-B may give a first phase rectifier 604A secondary winding outputs at −25° and +5° offset from the primary input; rectifier 604B secondary winding outputs at +15° and −15°; and rectifier 604C secondary winding outputs at −5° and +25°. The two outputs from each transformer 600A-B result in a total of four three-phase inputs being supplied to each phase rectifier 604A.

Figure 7:
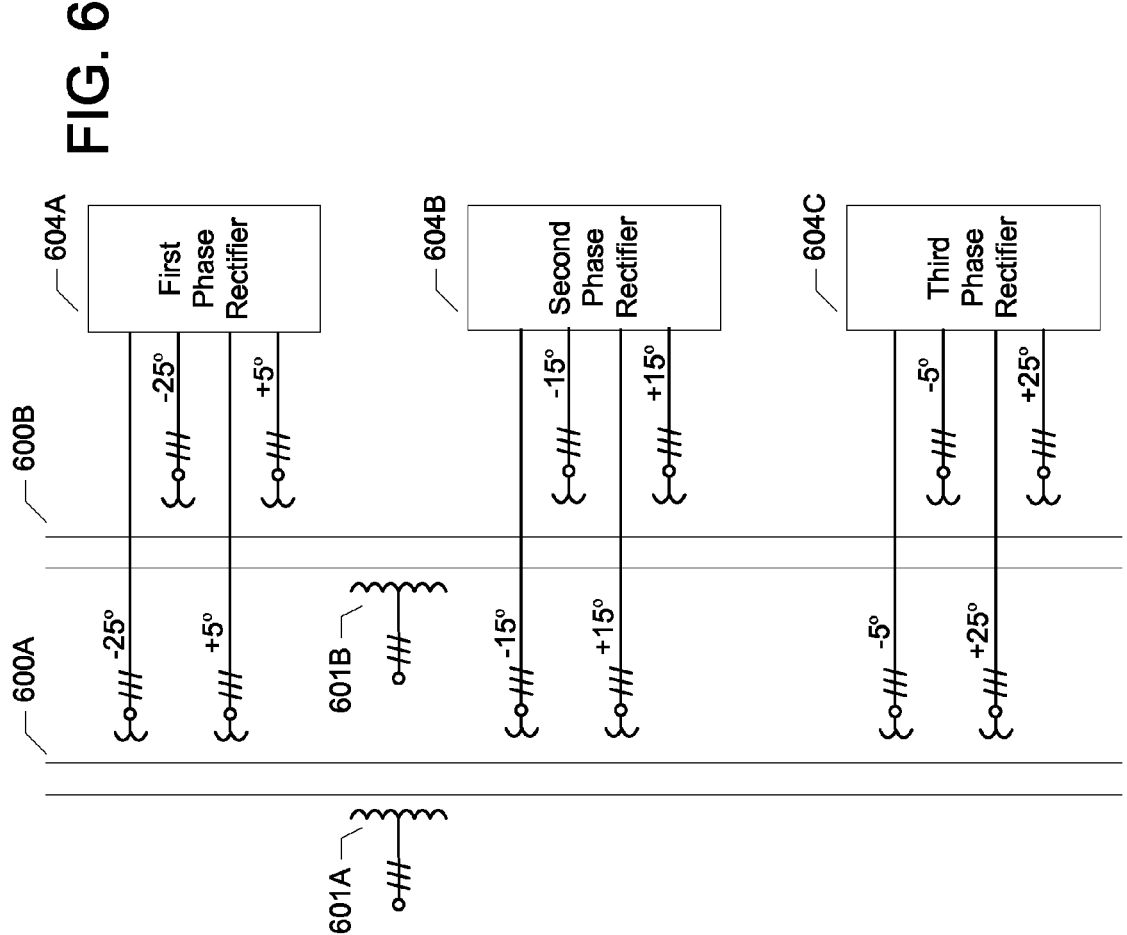
FIG. 7 illustrates in greater detail the construction of a phase rectifier that may be used in the configuration shown in FIG. 6.

FIG. 7 illustrates an example of a phase rectifier 604A. The phase rectifier 604A-C may be composed of four bridge rectifiers 701A-D in series, and the phase rectifier 604A-C may receive four inputs 702A-D from the secondary windings illustrated in FIG. 6. So, for example, phase rectifier 604A may receive an input at −25° at two inputs (702A, 702B), and at +5° at two inputs (702C, 702D). The other phase rectifiers 604B, 604C may also each receive two identical sets of secondary winding outputs from the transformers 600A-B, although their sets may be at different phase offsets from the offsets of the other phase rectifiers. In other words, each phase rectifier 604A-C may receive unique phase offsets that are not supplied to the other phase rectifiers in the system.

Aside from these features, the other operational details of the FIG. 6 and 7 embodiment may mirror those described above with respect to FIGS. 3 and 4. For example, the overall system may be an 18n-pulse system, where n is a positive integer. Each transformer 600A-B may generate 3n unique outputs at secondary windings, where the unique outputs are at phase offsets that may be 20/n degree intervals. Corresponding outputs supplied to the phase rectifiers 604A-B may also be at the 20/n degree intervals. Each phase rectifier 604A-C may receive 2n sets of inputs, with duplicate phase offsets being supplied by the transformers 600A-B, resulting in each phase rectifier 604A-C receiving n phases of three-phase input.

Each phase rectifier 604A-C may also include three outputs 703A-C, which may be coupled (e.g., via inverter circuitry) to supply three-phase input to a load, such as a motor (not shown). Each phase rectifier 604A-C may also have its own DC bus 704, which may be separate from the DC buses in the other phase rectifiers. Modifications to the FIG. 3 and 4 embodiment described herein may also be made to the FIG. 6 and 7 embodiment.

The various features, examples and embodiments described above are not intended to limit the scope of the present application, and many of the components may be divided, combined and/or subcombined with one another as desired. Additionally, the numeric values discussed herein (e.g., referring to phase relationships) represent target values, and engineering tolerances will necessarily cause some implementations to deviate slightly from the exact numbers used—any such values appearing herein should be read with an understanding that such engineering tolerance deviations may (and will) occur. Accordingly, the scope of the present patent should only be defined by the following claims.

We claim the following:

1. A drive system comprising:
    a first three-phase transformer having a first plurality of secondary windings;
    a second three-phase transformer having a second plurality of secondary windings, said windings in said second plurality having identical phases as corresponding secondary windings in said first transformer; and
    an 18n-pulse rectifier (n being a positive integer) having three phase rectifiers whose inputs are coupled to receive outputs from the secondary windings of said first and second transformers, wherein
        a first of said phase rectifiers is coupled to receive output at a common first phase from each of said transformers,
        a second of said phase rectifiers is coupled to receive output at a common second phase from each of said transformers, and
        a third of said phase rectifiers is coupled to receive output at a common third phase from each of said transformers, said first, second and third phases being different from one another.

2. The drive system of claim 1, wherein each phase rectifier includes a plurality of bridge rectifiers coupled in series.

3. The drive system of claim 1, wherein each transformer includes the same 3n phases of secondary winding outputs.

4. The drive system of claim 3, wherein each phase of secondary winding output from said first transformer is provided to only one of said phase rectifiers.

5. The drive system of claim 1, wherein said common first phase, common second phase, and common third phase are spaced at 20/n degree intervals.

6. The drive system of claim 1, wherein n>1, and each phase rectifier is coupled to n of said secondary windings, spaced apart at 60/n degrees, from each of said transformers.

7. The system of claim 1, wherein said drive system is a 36-pulse system, each phase rectifier is coupled to receive inputs from each of the transformers that are 30 degrees apart, and corresponding inputs to each phase rectifier are at 10 degree intervals.

8. The drive system of claim 1, wherein n=2, and:
    said common first phase is −25 degrees with respect to a primary input to the first and second transformers,
    said common second phase is −15 degrees with respect to said primary input to the first and second transformers, and
    said common third phase is −5 degrees with respect to said primary input to the first and second transformers.

9. A drive method, comprising:
    supplying voltages from two transformers having the same phases of secondary windings to three phase rectifiers, wherein a first of the phase rectifiers receives a common phase three-phase voltage from both transformers; and
    using said three phase rectifiers to drive a load.

10. The drive method of claim 9, further comprising supplying a three-phase input to primary windings of both of said transformers.

11. The drive method of claim 9, wherein each transformer generates 3n uniquely-phased sets of output voltage, n being a positive integer, said 3n sets being spaced apart at an interval of 20/n degrees.

12. The drive method of claim 11, wherein each transformer supplies n of said sets of output voltage to each of said phase rectifiers.

13. The drive method of claim 12, wherein the n sets of output voltages supplied to each of said phase rectifiers by a first of the transformers are of different phases from the sets of output voltage supplied to the other two of said phase rectifiers.

14. The drive method of claim 12, wherein n>1, and wherein the n sets of voltage supplied to each rectifier by each transformer are spaced apart at an interval of 60/n degrees.

15. The method of claim 9, wherein said supplying further comprises:
    each transformer supplying a first one of said phase rectifiers with input voltage that is 25 degrees behind a primary winding input, and input voltage that is 5 degrees ahead of said primary winding input;

each transformer supplying a second one of said phase rectifiers with input voltage that is 15 degrees behind said primary winding, and input voltage that is 15 degrees ahead of said primary winding input; and each transformer supplying a third one of said phase rectifiers with input voltage that is 5 degrees behind said primary winding, and input voltage that is 25 degrees ahead of said primary winding input.

16. A multi-pulse rectifier system, comprising:

a first transformer having 3n secondary windings spaced 20/n degrees apart, where n is an integer greater than one;

a second transformer having 3n secondary windings, at the phase offsets of said secondary windings in said first transformer;

a first phase rectifier coupled to a first group of said secondary windings from both said first and second transformers, said windings in said first group being separated by 60/n degrees of phase;

a second phase rectifier coupled to a second group of said secondary windings from both said first and second transformers, said windings in said second group being separated by 60/n degrees of phase and having different phases from said first group; and a third phase rectifier coupled to a third group of said secondary windings from both said first and second transformers, said windings in said third group being separated by 60/n degrees of phase and being of different phase from said first and second groups.

17. The system of claim 16, wherein said sets of secondary windings each comprise three lines of output at a common phase.

18. The system of claim 16, wherein said phase rectifiers each comprises four six-pulse diode bridges in series.

19. The system of claim 16, wherein n=2, and corresponding inputs to neighboring ones of said phase rectifiers are separated by 10 degrees of phase.

20. The system of claim 16, wherein:

secondary windings in said first group include a winding that is 25 degrees behind primary windings of said transformers, and a winding that is 5 degrees ahead of said primary windings;

secondary windings in said second group include a winding that is 15 degrees behind said primary windings of said transformers, and a winding that is 15 degrees ahead of said primary windings; and secondary windings in said third group include a winding that is 5 degrees behind said primary windings of said transformers, and a winding that is 25 degrees ahead of said primary windings.

* * * * *